(12) United States Patent
Flehinghaus et al.

(10) Patent No.: US 9,321,396 B2
(45) Date of Patent: Apr. 26, 2016

(54) ILLUMINATION DEVICE

(75) Inventors: Michael Flehinghaus, Reinbek (DE); Andreas Teitge, Hamburg (DE)

(73) Assignee: ALBIS Plastic GmbH, Hamburg (DE)

( * ) Notice: Subject to any disclaimer, the term of this patent is extended or adjusted under 35 U.S.C. 154(b) by 1131 days.

(21) Appl. No.: 11/815,555

(22) PCT Filed: Feb. 3, 2006

(86) PCT No.: PCT/EP2006/000967
§ 371 (c)(1),
(2), (4) Date: Oct. 16, 2008

(87) PCT Pub. No.: WO2006/082081
PCT Pub. Date: Aug. 10, 2006

(65) Prior Publication Data
US 2009/0213612 A1 Aug. 27, 2009

(30) Foreign Application Priority Data
Feb. 3, 2005 (DE) .......................... 10 2005 004 931

(51) Int. Cl.
*B60Q 1/26* (2006.01)
*C08L 69/00* (2006.01)
(Continued)

(52) U.S. Cl.
CPC ................ *B60Q 1/2607* (2013.01); *C08L 69/00* (2013.01); *F21V 3/04* (2013.01); *F21V 5/00* (2013.01);
(Continued)

(58) Field of Classification Search
CPC F21Y 2101/02; F21S 48/1241; F21S 48/215; F21S 48/2243; F21S 48/2287; F21V 2200/20; F21V 3/04; G02F 1/133504; G02F 1/133606; G09F 13/14; G02B 1/04; G02B 5/0263; G02B 5/0242; G02B 5/0278; G02B 6/00; G02B 6/0041; G02B 6/0028; G02B 5/0257; G02B 6/0073; B60Q 1/26; B60Q 1/28; F21W 2101/08
USPC ......... 362/487, 488, 507, 509, 511, 520, 540, 362/327, 329
See application file for complete search history.

(56) References Cited

U.S. PATENT DOCUMENTS 4,191,943 A * 3/1980 Cairns et al. .............. 340/815.42
5,325,271 A * 6/1994 Hutchisson .................... 362/555
(Continued)

FOREIGN PATENT DOCUMENTS

DE 296 22 671 U1 7/1997
DE 196 20 659 A1 11/1997
(Continued)

OTHER PUBLICATIONS

Translation of the Intl Preliminary Report on Patentability for PCT/EP2006/000967, Aug. 29, 2007, Intl Bureau of WIPO, 7 pages.
(Continued)

*Primary Examiner* — Hargobind S Sawhney
(74) *Attorney, Agent, or Firm* — North Weber & Baugh LLP (57) ABSTRACT

In order to provide an illumination device comprising at least one light source (1) and at least one diffusing element (2), which has a simple design and is economical to manufacture, the invention provides that the diffusing element (2) is composed of at least one diffusing plastic element (2) in which transparent diffusing bodies (3) are embedded in a transparent plastic mass (2), and the diffusing element (2) extends over at least one or more light sources (1) and is designed as an external housing part (2) of the illumination device.

13 Claims, 5 Drawing Sheets

(51) Int. Cl.
- *F21V 3/04* (2006.01)
- *F21V 5/00* (2015.01)
- *C08K 7/20* (2006.01)
- *F21S 8/10* (2006.01)
- *F21W 101/08* (2006.01)

(52) U.S. Cl.
CPC .............. *C08K 7/20* (2013.01); *F21S 48/1233* (2013.01); *F21S 48/2212* (2013.01); *F21W 2101/08* (2013.01)

(56) References Cited

U.S. PATENT DOCUMENTS

| | | | |
|---|---|---|---|
| 6,066,861 A * | 5/2000 | Hohn et al. | 257/99 |
| 6,348,960 B1 | 2/2002 | Etori et al. | |
| 6,464,382 B1 | 10/2002 | Duflos | |
| 6,621,973 B1 * | 9/2003 | Hoffman | G02B 6/0096 385/125 |
| 6,774,404 B2 * | 8/2004 | Imai | 257/98 |
| 7,431,489 B2 * | 10/2008 | Yeo et al. | 362/606 |
| 7,514,723 B2 * | 4/2009 | Arndt et al. | 257/99 |
| 2001/0028560 A1 | 10/2001 | Yachi et al. | |
| 2002/0093829 A1 | 7/2002 | Pinson et al. | |
| 2003/0030060 A1 * | 2/2003 | Okazaki | 257/79 |
| 2003/0080341 A1 * | 5/2003 | Sakano et al. | 257/79 |
| 2004/0223224 A1 | 11/2004 | Murata et al. | |
| 2005/0052885 A1 | 3/2005 | Wu | |
| 2006/0120076 A1 * | 6/2006 | Chen | A47G 33/08 362/231 |

FOREIGN PATENT DOCUMENTS

| | | |
|---|---|---|
| DE | 19620659 | 11/1997 |
| DE | 299 20 234 U1 | 3/2000 |
| DE | 694 19 968 T2 | 4/2000 |
| DE | 100 32 509 A1 | 2/2001 |
| EP | 1 197 765 A1 | 4/2002 |
| EP | 1 279 890 A1 | 1/2003 |
| EP | 1 344 975 A1 | 9/2003 |
| JP | 10-036655 | 2/1998 |
| JP | 11-038232 | 2/1999 |
| JP | 2000-294020 | 10/2000 |
| JP | 2001-250410 | 9/2001 |
| WO | WO 01/83255 A1 | 11/2001 |
| WO | WO03087656 | 10/2003 |
| WO | WO 2005/093477 A1 | 10/2005 |
| WO | WO 2006/082081 A1 | 8/2006 |

OTHER PUBLICATIONS

Chinese Office Action for related patent application, 2006800038356; mailed on Sep. 5, 2008; 7 pages.

Chinese Office Action for related patent application, 2006800038356; mailed on Mar. 20, 2009; 7 pages.

Chinese Decision of Rejection of the Application for related patent application, 2006800038356; mailed on Aug. 7, 2009; 7 pages.

Notification of Reasons for Refusal for related patent application in Japan, 2007-553545, mailed on May 27, 2010; 3 pages.

Notice of Opposition for related European Patent Application 1 848 918 B1, filed on Mar. 24, 2010; 20 pages.

* cited by examiner

ILLUMINATION DEVICE

CROSS REFERENCE TO RELATED APPLICATIONS

This application is the National Phase Application under 35 USC §371 of International Application No. PCT/EP2006/000967, filed Feb. 3, 2006, which claims priority to German Patent Application 10 2005 004 931.1, filed Feb. 3, 2005.

BACKGROUND

A. Technical Field

The present invention relates to a lighting device comprising at least one light source and at least one diffusing element.

B. Background of the Invention

Such lighting devices are widely used. For example, such lighting devices are used in motor vehicles, where they may assume the form of a tail light or headlight. At least the backup light and, for example, the brake light are generally located in the tail light or headlight. Recently there has been a design trend to also integrate the directional signal light, for example, into the tail light together with the backup light and the brake light, and/or to integrate the directional signal light, for example, into the headlight.

In one type of conventional lighting device having multiple light sources, a clear glass lens, for example, allows an unrestricted view of all components behind the lens. However, designers of vehicle lights such as headlights, directional signal lights, and/or tail lights, for example, must frequently meet the requirement for a uniform external appearance of these vehicle lights. Thus, with respect to the differently colored lights to be integrated into the headlight, for example a yellow directional signal light and a colorless low-beam light, it is undesirable for this color difference to be externally visible when neither of the lights is switched on. In order to provide lights having multiple light sources, for example lights for general illumination, headlights, directional signal lights, and/or tail lights for vehicles, or other lights for which it is not possible to see all the components behind same, for quite some time lights with headlight covers have been used which have a prismatic design or the like on the exit or incident surface. As a result of the prismatic surface, directional light beams are refracted and/or reflected in various directions from each light source, depending on the particular location on the surface at which the light beam strikes the headlight cover. In this manner the directional light beam is converted to predominantly diffuse light radiation. As a result, the components located behind the headlight cover are not visible, and during operation the light sources essentially have the external appearance of a single homogeneous light source. In contrast, when prismatic headlight covers are used it is disadvantageous that their manufacture is complex, since a specific surface structure must be impressed during casting. Furthermore, in many cases a prismatic headlight cover is not desirable from a design standpoint because, for example, a uniform appearance of the headlights and body is preferred.

An improved form of a generic lighting device is disclosed in DE 198 18 009 C2. The cited document describes a multilayer cover for multifunctional tail lights for onroad vehicles. The cover is composed essentially of a three-dimensionally deformed plastic film and at least one reinforcement layer made of plastic which has been extrusion molded onto the three-dimensionally deformed plastic film. One characteristic of these known covers is that the plastic film is designed as a light diffusion plate. In this manner the complex manufacture of light-diffusing optical elements integrally molded in one piece to the interior of conventional light covers is avoided. According to the disclosure, the light diffusion plate may be made of polycarbonate, for example, in which spheres or hemispheres in the form of homogeneously dispersed diffusing pigments are embedded. In this respect, the cover disclosed in the cited document is an improvement over the prismatic headlight covers described in the preceding paragraph above. However, one disadvantage of the device disclosed in the cited document is that once again the manufacture of the proposed multilayer design is complicated, since it requires a method for producing multilayered structures. Since according to Claim 4 of the cited document it is proposed that the layer of the plastic film provided as a light diffusion plate has a thickness of 50 to 700 µm, it is disadvantageous that a reinforcement layer must necessarily be applied for achieving the structural strength required for the headlight cover.

SUMMARY OF THE INVENTION

The object of the present invention, therefore, is to provide a lighting device, comprising at least one light source and at least one diffusing element, which has a simple design and is economical to manufacture.

The object is achieved by means of a lighting device comprising at least one light source and at least one diffusing element, whereby the diffusing element is composed of at least one diffusing plastic element in which transparent diffusing bodies are embedded in a transparent plastic mass, and the diffusing element extends over at least one or more light sources and is designed as an external housing part of the lighting device.

The advantage of this approach is that the transparent plastic mass has the function of the reinforcement layer as well as the function of the light diffusion plate. In this manner, by using only one component which is composed of the transparent plastic mass containing embedded transparent diffusing bodies, it is advantageously possible to design, for example, a light for general illumination, a headlight, directional signal light, and/or tail light for vehicles, for example, or some other light, the outer housing part of which intrinsically provides the function of light diffusion. The number of light sources may be advantageously reduced when a lighting device designed according to the invention is used. For example, the lighting device according to the invention may be used for lights for general illumination or in headlights, directional signal lights, and/or tail lights for vehicles, for industrial lights, lighted billboards, or deep-drawn lights such as square panels provided with neon lights, for example, such as those used in railway stations, for elongated lighting fixtures or other lights illuminated by a plurality of light-emitting diodes or a plurality of other light sources, which use a lower number of light-emitting diodes or other light sources than do conventional lights, since the intrinsic diffusion characteristics of the housing part convert the initial directionally emitted light from the light-emitting diodes or other light sources to essentially diffuse light radiation. From a design standpoint, this has the advantage that the light for general illumination, for headlights, directional signal lights, and/or tail lights for vehicles or any other lighting device according to the invention appears to be homogeneously illuminated without the multiple light sources being separately visible. In applications in which differently colored light sources are present within the lighting device, for example in integrated directional signal lights and tail lights and/or headlights, use of the lighting device according to the invention has the further advantage that the color difference is not visible in daylight in the shut-off state. This advantageously results in the uniform appearance of the lighting device frequently desired by designers.

In one particularly advantageous embodiment of the lighting device according to the invention, the transparent plastic mass is selected from the group comprising polycarbonates. Polycarbonates have the advantage that they possess particularly favorable material properties. The impact strength at low temperatures as well as resistance to high temperatures are particularly advantageous. In addition, the processing temperature of polycarbonates is particularly well suited for injection molding processes. The use of polycarbonates as a replacement for glass materials in the lighting devices according to the invention has the particular advantage of significant weight reduction. This results from the fact that the density of polycarbonate is less than half that of glass. Furthermore, in most cases polycarbonate is more economical than glass. Fireproof polycarbonates as well as high-temperature polycarbonates are also particularly suitable.

When polycarbonates are used as the transparent plastic mass, it has proven to be particularly advantageous for the diffusion characteristics when the weight fraction of the embedded transparent diffusion bodies is 0.0001 to 10%, preferably 1%, and the diffusion bodies preferably have a size of approximately 0.1 μm to 5 μm, preferably 2.5 μm. In addition, for achieving optimal homogenization of the light with regard to the transmission angle it is advantageous when the size of the diffusion bodies has a narrow Gaussian distribution composed of different sizes. Bi- and multimodal narrow Gaussian distributions have proven to be particularly suitable. Particularly good diffusion characteristics are also obtained when the inclusions have an essentially spherical shape. When the diffusion bodies are admixed with the polycarbonate, it has surprisingly been shown that in particular the desired mechanical properties of the polycarbonate are maintained. Thus, it is advantageous that the mechanical properties of the polycarbonate are not adversely affected by admixture of the diffusion bodies. The use of polycarbonate together with the embedded diffusion bodies as described above according to the invention has the further advantage that in daylight, for example, a dark appearance considered to be particularly esthetic by designers is obtained when the light sources are not switched on. The polycarbonate may also be colored as desired, so that any given number of design color requirements may be met.

According to one specialized embodiment of the lighting device according to the invention, the lighting device is designed for general illumination. In contrast to conventional lights for general illumination, which are usually made of glass, the lighting device according to the invention has the advantage of having approximately half the mass. A light designed according to the invention for general illumination also has advantages with regard to operational safety, since there is no risk of glass splinters resulting from, for example, external impacts or from breakage of the light caused by bursting of the light bulb. In addition, the light designed according to the invention for general illumination may advantageously be manufactured more economically than conventional lights, which often are made of glass. The design of the lighting device according to the invention as a light for general illumination is also very advantageous because, for example, when polycarbonate is used as the plastic element the superior deformability of this material allows manufacture of virtually any given shape of lights for general illumination. Thus, optimal use may advantageously be made of current commercial design trends for general illumination.

According to another advantageous embodiment of the lighting device according to the invention, the lighting device is designed as a directional signal light, in particular a directional signal light for vehicles, especially motor vehicles. In contrast to conventional prismatic or glass directional signal lights, such a directional signal light according to the invention is advantageous due to the weight savings compared to lights made of PMMA or glass. In addition, these directional signal lights may be manufactured more economically than conventional prismatic and/or PMMA or glass directional signal lights. In particular, this may advantageously be coordinated with the trend observed in the automobile industry toward increasingly smaller directional signal lights, while at the same time meeting automotive regulatory requirements for good visibility of the directional signal lights from the widest possible viewing angle.

When according to one refinement of the invention the lighting device is designed as a multifunctional rear light and/or front light for vehicles, in particular motor vehicles, a directional signal light, for example, may advantageously be integrated into the headlight. It is thus possible, for example, to selectively provide only the segment of the multifunctional light with diffusive material which, for example, covers the directional signal light, in order to expand same without simultaneously expanding the light from the headlight, for example. When differently colored plastics are used in different segments of the multifunctional light according to the invention, prevailing design requirements may be easily and advantageously met.

According to a further advantageous embodiment variant according to the present invention, the lighting device is designed as a tail light for vehicles, in particular motor vehicles. In this case, integration of multiple lights, for example the directional signal light, backup light, and brake light, inside a lamp housing reduces the number of components needed for homogenization of light radiation emitted by light-emitting diodes or filament bulbs, for example, with benefits for the manufacturing costs. A further advantage of using polycarbonates is that this material is already widely used in particular in the automobile industry for fabrication of lamp covers. Therefore, a separate authorization procedure for this material for use as a headlight cover may be omitted for the most part. Therefore, in this sector the lighting device according to the invention may be rapidly employed to great advantage. The mechanical and thermal resistance of polycarbonates is particularly advantageous when the material is used for housing parts for ground vehicles, watercraft, and aircraft.

According to another embodiment of the invention, the lighting device is designed as a headlight for vehicles, in particular motor vehicles. In particular when the directional signal light is also integrated into the headlight, especially for motor vehicles, this has the advantage that the light source for producing the light for the directional signal, which is usually small relative to the headlight, is converted by diffusion into diffuse light having a large surface area. The visibility of the directional signal light is thus significantly improved, to great advantage. Producing diffuse light radiation for the directional signal light has the further advantage that the directional signal light is visible essentially from all important viewing angles. In particular, visibility from the side of the vehicle is especially advantageous for pedestrians, or for traffic on either side, is advantageous for traffic safety. In addition, as a result of the headlight cover simultaneously having the characteristics of a headlight housing and of a diffusion plate it is not possible to see the internal components of the headlight, in particular the lenses inside the headlight. This has the advantage of providing less appeal for vandalism.

In one refinement of the lighting device according to the invention, the lighting device is designed as a billboard. The advantage is that the uniformly homogeneous illumination desired for billboards is ensured, and at the same time the number of light sources used for illumination is reduced. Particularly for cases in which billboards are illuminated using a matrix of light-emitting diodes, the number of light pixels may be reduced with great cost savings due to the diffusive characteristics of the housing material according to the invention. Integration of the diffusive function directly into the housing part advantageously results in a very simple design of the billboard. Weight reduction is advantageously achieved when a billboard according to the invention is used to replace a conventional billboard made of PMMA or a similar material. Furthermore, in the event of breakage of the billboard, by vandalism, for example, there is a much lower safety risk since polycarbonate does not shatter.

According to one refinement of the invention, the lighting device according to the invention is designed as an indoor light. In this manner the requirement to achieve diffuse illumination of a room using the fewest possible light sources, frequently imposed in particular by interior designers, may be advantageously met in a particularly economical manner. The fact that diffuse light is intrinsically produced within the housing of the indoor light eliminates the need for additional optical devices within the indoor light, thereby significantly reducing the complexity of manufacture. Since the number of light sources, in particular filament bulbs or light-emitting diodes, may be reduced by the homogeneous distribution of the light radiation emitted by the light sources, this results in the additional advantage that the operating costs of an indoor light according to the invention are particularly low.

In a further variant of the invention, the lighting device is designed as interior lighting for vehicles, in particular motor vehicles. By the fact that the interior lighting according to the invention produces essentially diffuse light as a result of its diffusive characteristics, an interior light is advantageously provided which largely eliminates an undesirable blinding effect for the driver, which frequently occurs for interior lights having a directional light beam. Since the light diffusion is ensured by the intrinsic optical properties of the housing of an interior light for vehicles designed according to this variant of the invention, a prismatic or similar plastic surface structuring, which is complicated from a manufacturing standpoint and often undesirable for optical design reasons, may be omitted, thus advantageously reducing the manufacturing costs. This variant of the invention is also well suited for use as ambient lighting in interior spaces or in the passenger cabin of aircraft.

In another embodiment of the invention the lighting device is designed as an emergency switch light. Since the plastic material may be deformed in practically any given shape, according to the invention the lighting device may advantageously be used for many different types of emergency switches, the emergency switches being lighted in such a way that such switches fulfill both a signal function and a lighting function. Thus, emergency switches according to the invention may be used to great advantage, for example, for marking emergency exits in buildings, in industrial facilities, and on ships or aircraft. It is particularly advantageous that as a result of the diffuse light the illumination is visible from a wide viewing angle, thereby enhancing safety. In particular for emergency switches it is also very important that no glass be used, which due to breakage in a hazardous event, for example, could introduce an additional hazard source.

The object of the invention is further achieved in a particularly effective manner by use of a plastic having an embedded light diffusing element, in which polycarbonate-acrylonitrile-butadiene-styrene (PC-ABS) is selected as the plastic.

With regard to achieving the object of the invention, this material has the advantageous property that it may be electroplated, and also has an intense light-diffusing characteristic. Due to the capability for electroplating, assurance is provided that an adherent metal coating, such as chrome plating, may be applied on the surface of the material according to the appropriate known processes. As a result of embedding ABS, the material unexpectedly acquires enhanced transmission due to the increased light diffusion. This is all the more surprising since butadiene as such is known for its powerful light-absorbing properties. The invention is described in one preferred embodiment, with reference to a drawing by way of example.

DETAILED DESCRIPTION OF THE PREFERRED EMBODIMENTS

Figure 1:
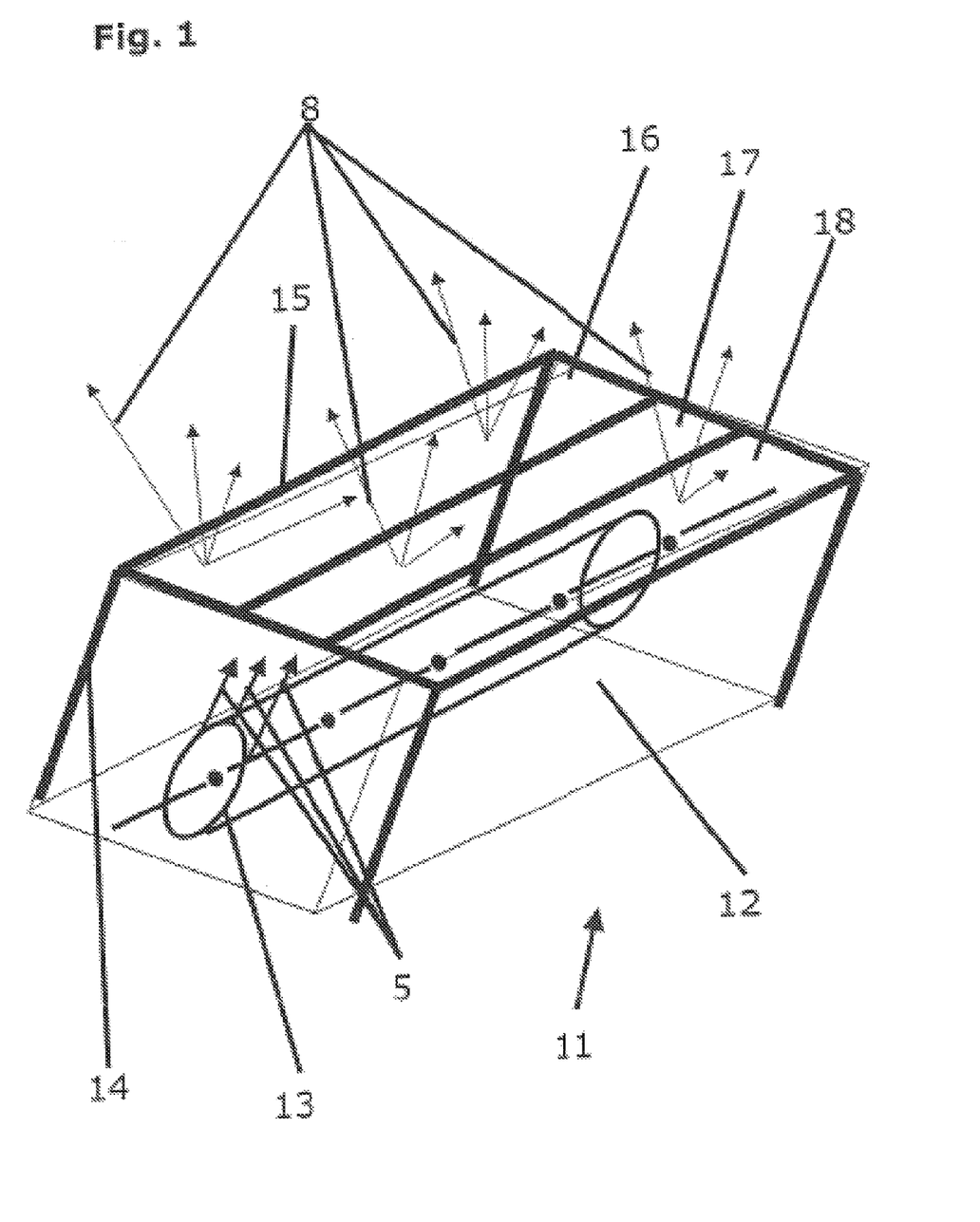
FIG. 1: shows a schematic illustration of a light according to the invention for general illumination.

FIG. 1 schematically illustrates an oblong light for general illumination 11. The light source 13 is located in the interior space 12 of the light for general illumination 11. The lamp cover 14 of the light for general illumination 11 has a parallelepiped shape, and is produced from polycarbonate mixed with spherical diffusing elements. As a result of the superior deformability of polycarbonate, the mechanical properties of which are not influenced by admixture of the diffusing elements, within the scope of the invention practically any other shape is possible besides the parallelepiped shape shown by way of example. At the upper side 15 the parallelepiped lamp cover 14 is divided into three segments 16, 17, 18. Each segment is composed of polycarbonate of a different color. The light source 13 emits essentially a concentrated light beam 5. The concentrated light beam 5 is converted to diffuse light radiation 8 in the lamp cover 14 composed of polycarbonate with embedded diffusing elements. In this manner a light which may have practically any given shape is provided for general illumination 14, by means of which the essentially directional light 8 from the light source 13 is converted to homogeneous, diffuse light radiation 8. In addition, the white light from the light source 13 is emitted in a color which may be different depending on the segment.

Figure 2:
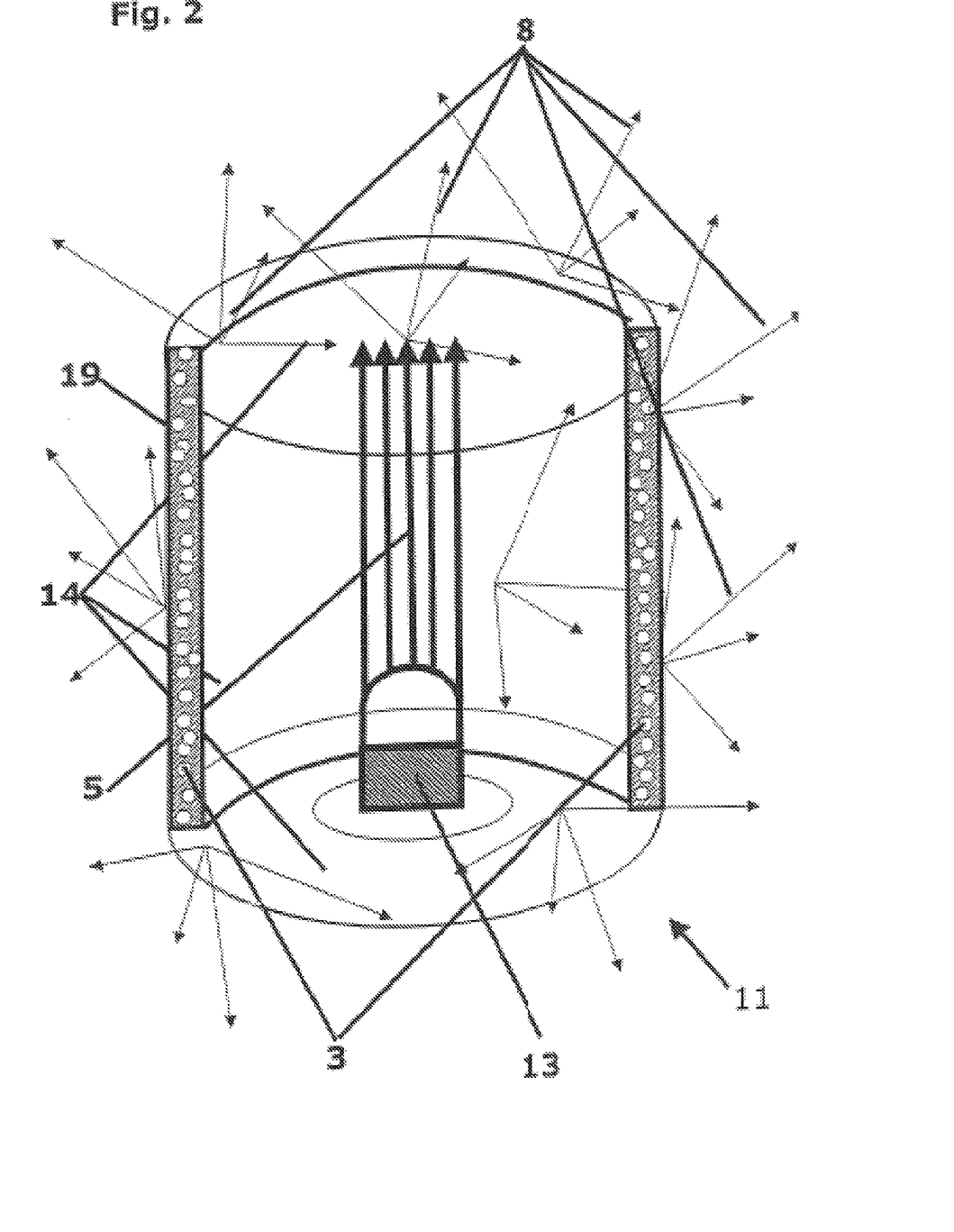
FIG. 2 shows a schematic illustration of another light according to the invention for general illumination.

FIG. 2 schematically shows another light for general illumination 11, having a light source 13 located in the lamp cover 14. The light 11 is illustrated in a partial sectional view. The lamp cover 14 annularly encloses the light source 13 on the sides in the form of a lateral cylindrical surface, and also surrounds the light source on the top and bottom sides in the manner of a cap. The lamp cover 14 is also produced from polycarbonate mixed with spherical diffusing elements 3. Once again the light source 13 emits essentially a concentrated light beam 5. The concentrated light beam 5 is multiply diffused inside the lamp cover 14 by the diffusing elements 3, and in this manner is converted to diffuse light radiation 8. In addition, as a result of the light guide effect the lamp cover composed of polycarbonate mixed with diffusing elements 3 diffusely emits the light over the entire exterior surface 19 of the lamp cover 14.

Figure 3:
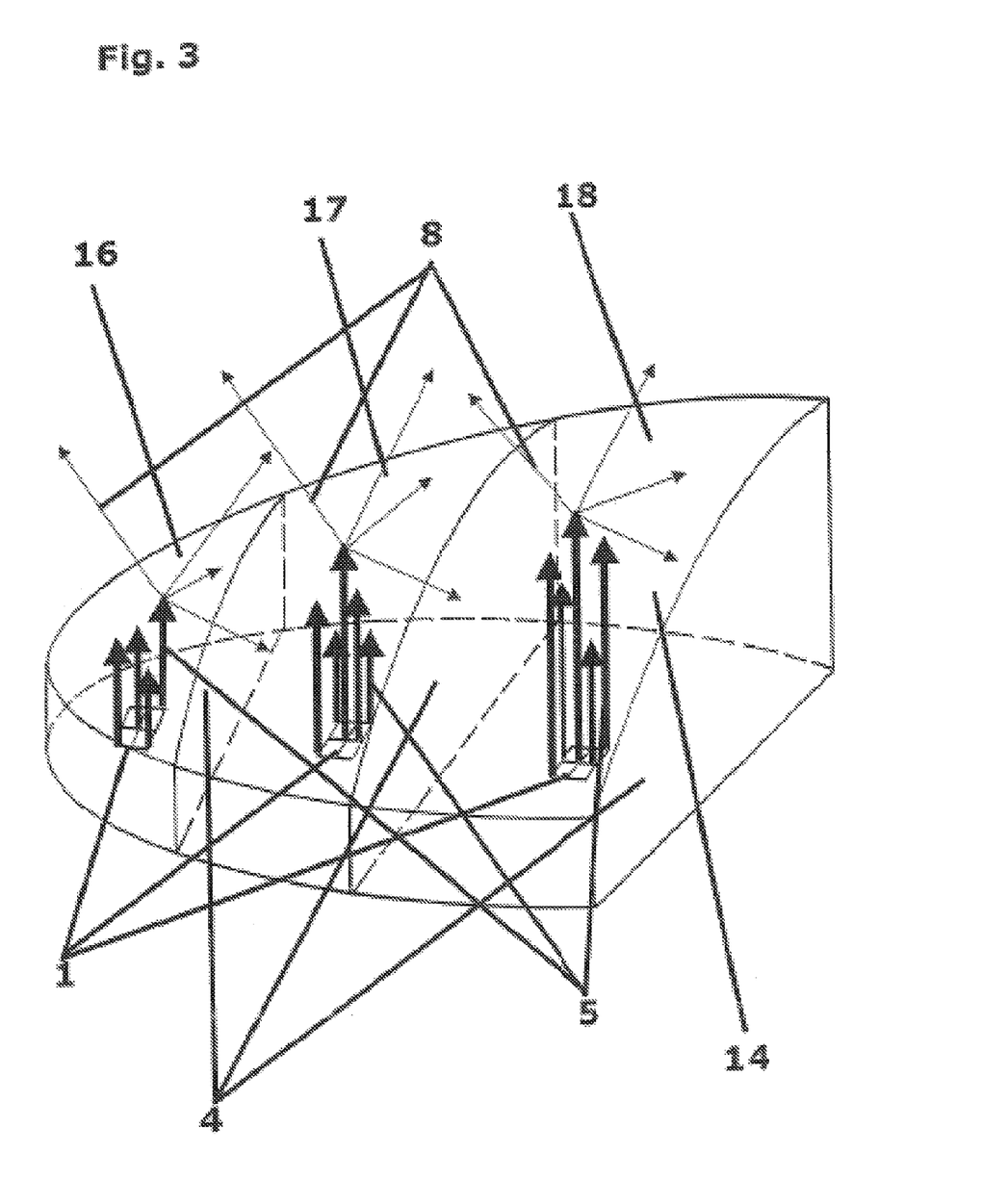
FIG. 3: shows a schematic illustration of a multifunctional tail light according to the invention.

FIG. 3 schematically illustrates the exterior of a multifunctional tail light for motor vehicles. The light cover 14 is divided into segments 16, 17, 18, and is composed of polycarbonate mixed with spherical diffusing elements. Segment 16 is produced from red-colored polycarbonate, segment 17, from yellow-colored polycarbonate, and segment 18, from transparent colorless polycarbonate. Inside the housing 4 for the multifunctional tail light are located three light-emitting diodes 1, each associated with one of segments 16, 17, 18. Each light-emitting diode 1 emits concentrated light beams 5. The concentrated light beams are multiply diffused by the diffusing elements which are mixed through the entire volume of the housing 4, and emerge from the light cover 14 in segments 16, 17, 18 as diffuse light radiation 8.

This specialized embodiment according to the invention provides a multifunctional tail light in which the red-colored segment 16 has the function of a tail light, the yellow-colored segment 17 has the function of a directional signal light, and the colorless segment 18 has the function of a backup light during backward travel. The multiple diffusion of the light inside the light cover 14 ensures that the light is easily visible from different viewing angles, and also that the surface area of each segment 16, 17, 18 is illuminated.

Figure 4:
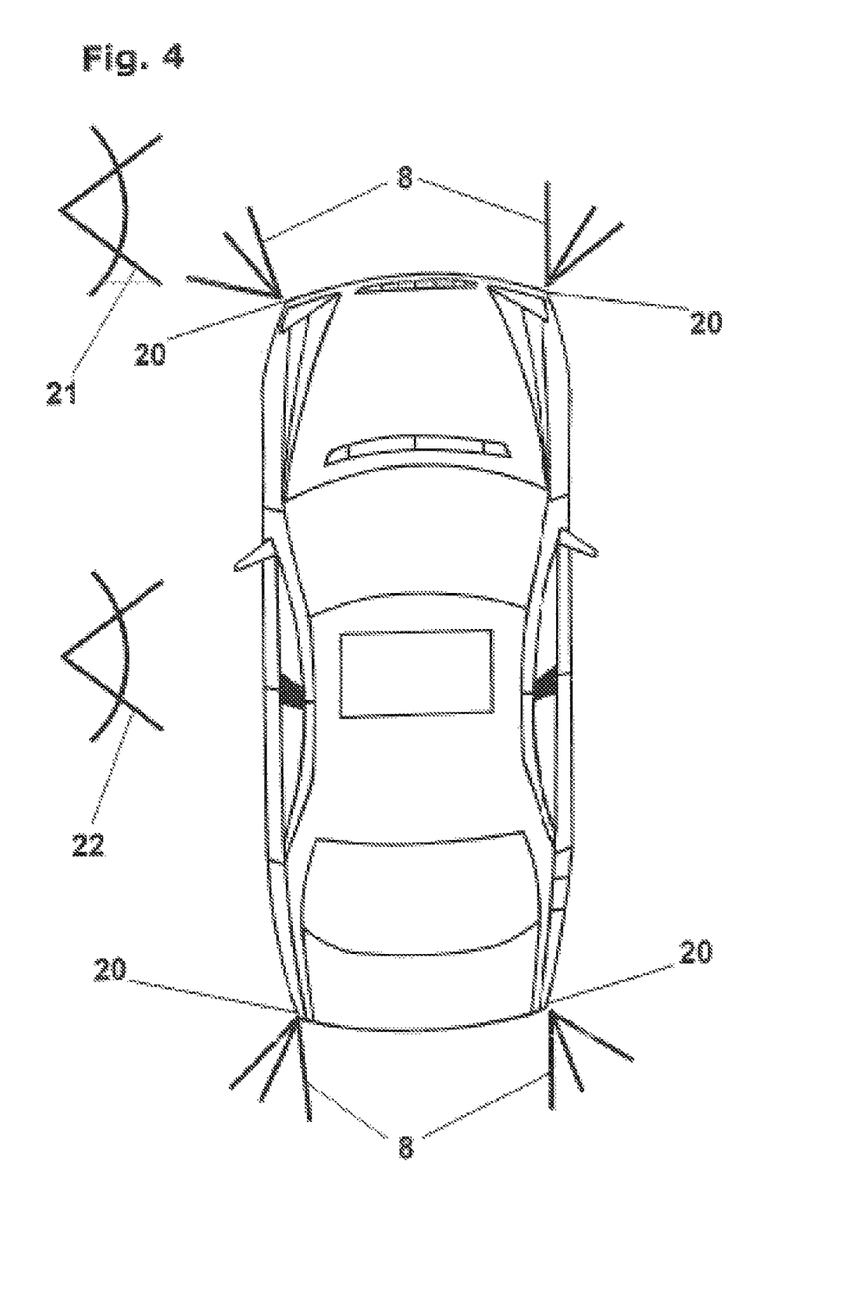
FIG. 4 shows a schematic illustration of the configuration of directional signal lights according to the invention in a motor vehicle.

FIG. 4 schematically shows the configuration of directional signal lights 20 on a motor vehicle. The directional signal lights 20, produced from polycarbonate with embedded diffusing elements, emit diffuse light radiation 8. The diffuse light radiation 8 emitted by each directional signal light 20 is easily seen by observer 21 as well as by observer 22, although observers 21, 22 observe the directional signal light 20 from very different viewing angles.

Figure 5:
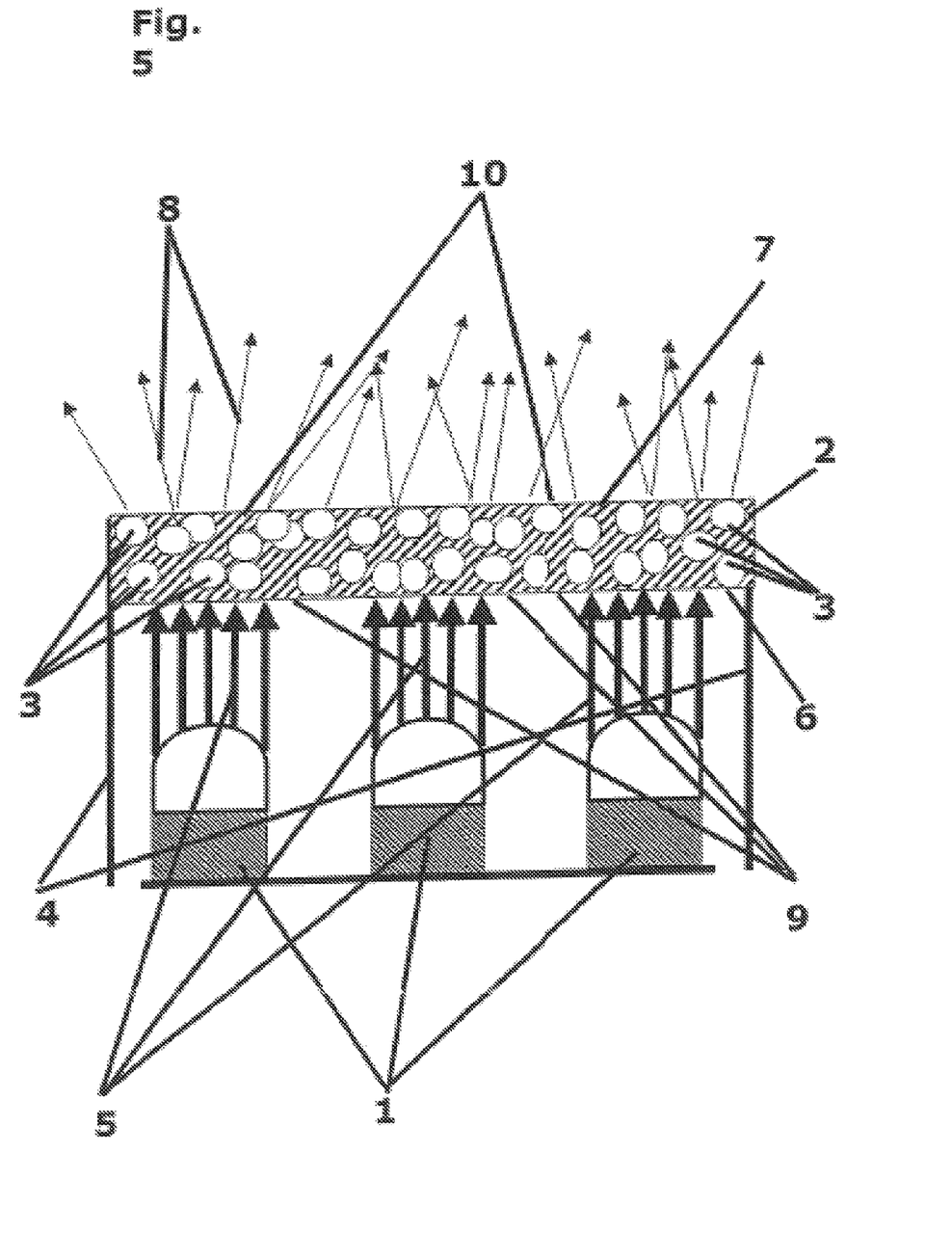
FIG. 5 shows a schematic illustration of a tail light according to the invention, having multiple light-emitting diodes as light sources.

FIG. 5 shows a brake light containing three light-emitting diodes 1. The light-emitting diodes 1 are located inside a cover plate 2 for the brake light. The cover plate 2 is produced from polycarbonate mixed with spherical diffusing elements 3. At the same time the cover plate 2 forms the housing 4 for the tail light.

When the tail light is operating, each of the light-emitting diodes 1 emits essentially a concentrated light beam 5. The concentrated light beam 5 from each of the light-emitting diodes 1 strikes the interior 6 of the cover plate 2. The concentrated light beam 5 does not strike the unlighted area section 9 of the interior 6 of the cover plate 2. Inside the cover plate 2 for the tail light the concentrated light beams 5 are multiply diffused by the diffusing elements 3 embedded in the polycarbonate. Diffuse light radiation emerges at the exterior 7 of the cover plate 2. Thus, diffuse light radiation 8 is emitted from the cover plate 2 over the entire surface of the exterior 7. In addition, the area sections 10 on the exterior 7 of the cover plate 2, opposite from the unlighted area sections 9 in the interior 6, emit diffuse light radiation 8. Thus, by means of a tail light composed of surprisingly few components, diffuse light radiation 8 may be emitted from the entire exterior 7 of the cover plate 2, although the concentrated light beams 5 from the light-emitting diodes 1 do not illuminate the area sections 9 on the interior 6 of the cover plate 2.

LIST OF REFERENCE NUMERALS

1 Light-emitting diode
2 Cover plate
3 Diffusing element
4 Housing
5 Concentrated light beam
6 Interior
7 Exterior
8 Diffuse light radiation
9 Area section
10 Area section
11 Light for general illumination
12 Interior space
13 Light source
14 Lamp cover
15 Upper side
16 Segment
17 Segment
18 Segment
19 Exterior surface
20 Directional signal light
21 Observer
22 Observer

The invention claimed is:

1. A lighting device comprising:
at least one light source;
an external housing extending over the at least one light source and comprising one layer of transparent plastic mass embedded with transparent diffusing bodies; and
the transparent plastic mass having an inner surface facing the at least one light source and an outer surface that forms an outer surface of the lighting device, the transparent plastic mass further comprising multiple segments having different colors,
wherein a size of the transparent diffusing bodies exhibits a predefined narrow multimodal Gaussian distribution.

2. The lighting device according to claim 1, wherein the transparent plastic mass is colored.

3. The lighting device according to claim 1, wherein the transparent plastic mass is selected from the group consisting of polycarbonates.

4. The lighting device according to claim 3, wherein the polycarbonate is fireproof or resistant to high temperature.

5. The lighting device according to claim 1, wherein the lighting device is a light for general illumination.

6. The lighting device according to claim 1, wherein the lighting device is a directional signal light for a vehicle.

7. The lighting device according to claim 1, wherein the lighting device is a multifunctional rear light or front light for a vehicle.

8. The lighting device according to claim 1, wherein the lighting device is a tail light for a vehicle.

9. The lighting device according to claim 1, wherein the lighting device is a headlight for a vehicle.

10. The lighting device according to claim 1, wherein the lighting device is an element within a billboard.

11. The lighting device according to claim 1, wherein the lighting device is an indoor light.

12. The lighting device according to claim 1, wherein the lighting device provides interior lighting for a vehicle.

13. The lighting device according to claim 1, wherein the lighting device is an emergency switch light.

* * * * *